(12) United States Patent
Graumann

(10) Patent No.: US 11,663,076 B2
(45) Date of Patent: May 30, 2023

(54) MEMORY ADDRESS PROTECTION

(71) Applicant: Microchip Technology Inc., Chandler, AZ (US)

(72) Inventor: Peter John Waldemar Graumann, Calgary (CA)

(73) Assignee: Microchip Technology Inc., Chandler, AZ (US)

(*) Notice: Subject to any disclaimer, the term of this patent is extended or adjusted under 35 U.S.C. 154(b) by 0 days.

(21) Appl. No.: 17/825,352

(22) Filed: May 26, 2022

(65) Prior Publication Data

US 2022/0382629 A1 Dec. 1, 2022

Related U.S. Application Data

(60) Provisional application No. 63/195,618, filed on Jun. 1, 2021.

(51) Int. Cl.
| | | |
|---|---|---|
| *G06F 11/10* | (2006.01) | |
| *G06F 11/00* | (2006.01) | |
| *H03M 13/00* | (2006.01) | |

(52) U.S. Cl.
CPC ...... *G06F 11/1048* (2013.01); *G06F 11/1044* (2013.01)

(58) Field of Classification Search
CPC .. G06F 11/1048; G06F 11/1044; H03M 13/00
See application file for complete search history.

(56) References Cited

U.S. PATENT DOCUMENTS

| | | |
|---|---|---|
| 7,139,312 B2 | 11/2006 | Graumann |
| 7,415,584 B2 | 8/2008 | Gibb et al. |
| 7,428,564 B2 | 9/2008 | Gibb et al. |
| 7,916,641 B2 | 3/2011 | Bourlas et al. |
| 7,961,593 B2 | 6/2011 | Porat et al. |
| 8,196,024 B2 | 6/2012 | Asirvatham et al. |
| 8,386,870 B2 | 2/2013 | Graumann |
| 8,509,073 B2 | 8/2013 | Bourlas et al. |
| 8,594,135 B2 | 11/2013 | Porat et al. |

(Continued)

OTHER PUBLICATIONS

PCT/US2022/031068, International Search Report and Written Opinion, European Patent Office, dated Sep. 14, 2022.

*Primary Examiner* — Justin R Knapp
(74) *Attorney, Agent, or Firm* — Glass and Associates; Kenneth Glass

(57) ABSTRACT

A method for memory protection includes receiving a burst-write instruction that includes data and a burst-write address. The data are segmented into a plurality of data blocks. One or more bits of the burst-write address, or a hash of the burst-write address are concatenated to respective data blocks to obtain data-and-write-address-bit (DWAB) segments. A SECDED ECC is executed on respective DWAB segments to generate a corresponding plurality of sets of parity bits (DWAB-PB). Respective DWAB-PB are concatenated to the corresponding data block to generate corresponding forward-error-correction (FEC) blocks, none of the FEC blocks including the burst-write address or the hash of the burst-write address. A burst-write command and a respective portion of a respective FEC block is sent to respective memory devices during a plurality of beats until all of the beats of the burst-write have been sent.

20 Claims, 11 Drawing Sheets

(56) References Cited

U.S. PATENT DOCUMENTS

| | | |
|---|---|---|
| 8,625,498 B2 | 1/2014 | Bourlas et al. |
| 8,631,309 B2 | 1/2014 | Graumann et al. |
| 8,639,998 B2 | 1/2014 | Graumann |
| 8,656,257 B1 | 2/2014 | Micheloni et al. |
| 8,679,845 B2 | 3/2014 | Maizels et al. |
| 8,694,849 B1 | 4/2014 | Micheloni et al. |
| 8,694,855 B1 | 4/2014 | Micheloni et al. |
| 8,707,122 B1 | 4/2014 | Micheloni et al. |
| 8,892,976 B2 | 11/2014 | Graumann |
| 8,938,037 B1 | 1/2015 | Fard et al. |
| 8,966,335 B2 | 2/2015 | Lunelli et al. |
| 8,971,112 B2 | 3/2015 | Crippa et al. |
| 8,971,396 B1 | 3/2015 | Bates et al. |
| 8,990,661 B1 | 3/2015 | Micheloni et al. |
| 9,009,565 B1 | 4/2015 | Northcott et al. |
| 9,026,867 B1 | 5/2015 | Northcott et al. |
| 9,053,012 B1 | 6/2015 | Northcott et al. |
| 9,081,701 B1 | 7/2015 | Northcott et al. |
| 9,092,353 B1 | 7/2015 | Micheloni et al. |
| 9,128,858 B1 | 9/2015 | Micheloni et al. |
| 9,166,623 B1 | 10/2015 | Bates et al. |
| 9,170,876 B1 | 10/2015 | Bates et al. |
| 9,208,018 B1 | 12/2015 | Northcott et al. |
| 9,235,467 B2 | 1/2016 | Micheloni et al. |
| 9,270,296 B1 | 2/2016 | Anaraki et al. |
| 9,305,661 B2 | 4/2016 | Micheloni et al. |
| 9,325,347 B1 | 4/2016 | Graumann et al. |
| 9,397,701 B1 | 7/2016 | Micheloni et al. |
| 9,417,804 B2 | 8/2016 | Micheloni et al. |
| 9,432,053 B1 | 8/2016 | Graumann et al. |
| 9,448,881 B1 | 9/2016 | Micheloni et al. |
| 9,450,610 B1 | 9/2016 | Micheloni et al. |
| 9,454,414 B2 | 9/2016 | Micheloni et al. |
| 9,467,172 B1 | 10/2016 | Graumann et al. |
| 9,473,175 B1 | 10/2016 | Graumann et al. |
| 9,479,297 B2 | 10/2016 | Graumann |
| 9,524,210 B1 | 12/2016 | Asnaashari |
| 9,564,921 B1 | 2/2017 | Graumann et al. |
| 9,564,922 B1 | 2/2017 | Graumann et al. |
| 9,590,656 B2 | 3/2017 | Micheloni et al. |
| 9,602,133 B1 | 3/2017 | Graumann et al. |
| 9,742,439 B1 | 8/2017 | Graumann |
| 9,747,200 B1 | 8/2017 | Micheloni |
| 9,793,924 B1 | 10/2017 | Graumann et al. |
| 9,799,405 B1 | 10/2017 | Micheloni et al. |
| 9,813,080 B1 | 11/2017 | Micheloni et al. |
| 9,860,089 B2 | 1/2018 | Lee et al. |
| 9,886,214 B2 | 2/2018 | Micheloni et al. |
| 9,892,794 B2 | 2/2018 | Micheloni et al. |
| 9,899,092 B2 | 2/2018 | Micheloni |
| 10,152,273 B2 | 12/2018 | Micheloni et al. |
| 10,157,677 B2 | 12/2018 | Marelli et al. |
| 10,230,396 B1 | 3/2019 | Micheloni et al. |
| 10,230,552 B1 | 3/2019 | Graumann |
| 10,236,915 B2 | 3/2019 | Graumann et al. |
| 10,283,215 B2 | 5/2019 | Marelli et al. |
| 10,291,263 B2 | 5/2019 | Marelli et al. |
| 10,332,613 B1 | 6/2019 | Micheloni et al. |
| 10,505,707 B2 | 12/2019 | Graumann |
| 10,700,713 B2 | 6/2020 | Graumann et al. |
| 10,972,249 B1 | 4/2021 | Graumann |
| 10,977,118 B2 | 4/2021 | Niu et al. |
| 11,086,716 B2 | 8/2021 | Graumann |
| 11,165,443 B2 | 11/2021 | Graumann |
| 2002/0144210 A1 | 10/2002 | Borkenhagen et al. |
| 2003/0219083 A1 | 11/2003 | Graumann |
| 2005/0015420 A1 | 1/2005 | Gibb et al. |
| 2005/0114420 A1 | 5/2005 | Gibb et al. |
| 2005/0114421 A1 | 5/2005 | Gibb et al. |
| 2008/0002567 A1 | 1/2008 | Bourlas et al. |
| 2008/0176577 A1 | 7/2008 | Bourlas et al. |
| 2008/0288569 A1 | 11/2008 | Gibb et al. |
| 2009/0190465 A1 | 7/2009 | Porat et al. |
| 2009/0327820 A1 | 12/2009 | Asirvatham et al. |
| 2010/0037112 A1 | 2/2010 | Graumann |
| 2010/0238993 A1 | 9/2010 | Huang et al. |
| 2010/0329322 A1 | 12/2010 | Mobin et al. |
| 2011/0176446 A1 | 7/2011 | Bourlas et al. |
| 2011/0242964 A1 | 10/2011 | Porat et al. |
| 2012/0300873 A1 | 11/2012 | Graumann et al. |
| 2013/0243070 A1 | 9/2013 | Ito et al. |
| 2013/0254628 A1 | 9/2013 | Kim et al. |
| 2014/0040697 A1 | 2/2014 | Loewenstein |
| 2015/0067446 A1 | 3/2015 | Yen et al. |
| 2015/0074481 A1 | 3/2015 | Graumann |
| 2015/0100860 A1* | 4/2015 | Lee ............... G06F 13/28 714/786 |
| 2016/0127155 A1 | 5/2016 | Johnson et al. |
| 2017/0005841 A1 | 1/2017 | Komori et al. |
| 2017/0288699 A1 | 10/2017 | Yang et al. |
| 2018/0005670 A1* | 1/2018 | Lee ............... G11C 7/1072 |
| 2018/0032282 A1 | 2/2018 | Hahn et al. |
| 2018/0034483 A1 | 2/2018 | Graumann et al. |
| 2018/0046541 A1 | 2/2018 | Niu et al. |
| 2018/0167240 A1 | 6/2018 | Li et al. |
| 2018/0314586 A1* | 11/2018 | Artieri ............... G06F 3/0619 |
| 2019/0044539 A1 | 2/2019 | Graumann et al. |
| 2019/0149168 A1 | 5/2019 | Chang et al. |
| 2019/0149169 A1 | 5/2019 | Chang et al. |
| 2019/0207740 A1 | 7/2019 | Graumann |
| 2020/0106461 A1 | 4/2020 | Graumann |
| 2020/0183826 A1 | 6/2020 | Beaudoin et al. |
| 2021/0028795 A1 | 1/2021 | Graumann |
| 2022/0052710 A1 | 2/2022 | Graumann |
| 2022/0365845 A1* | 11/2022 | Buch ............... G06F 11/076 |

* cited by examiner

100

101
Receive a burst-write instruction that includes data and a burst-write address (Opt. the burst-write instruction is double-data-rate (DDR)-burst-write command that is received at a DDR-memory controller, and the memory devices comprise DDR memory devices)

102
Segment the data into a plurality of data blocks (Opt. the number of date blocks is equal to the number of beats)

103
Concatenate one or more bits of the burst-write address, or a hash of the burst-write address (the write address bits) to respective data blocks of the plurality of data blocks to obtain a plurality of data-and-write-address-bit (DWAB) segments (Opt. the write address bits concatenated to the end of each of the data blocks, to the beginning of each of the data blocks or at predetermined locations within each of the data blocks)

104
Step 103 includes concatenating the one or more bits of the burst-write address, or a hash of the burst-write address and a poison-indication bit to respective data blocks of the plurality of data blocks to obtain the DWAB segments, the value of the poison-indication bit in each DWAB segment in a burst-write set to a first predetermined value (non-poison-bit value) to indicate that the burst-write does not has an error and set to a second predetermined value that is different from the first predetermined value (poison-bit value) to indicate that the burst-write has an error

105
Execute a Single Error Correction Double Error Detection (SECDED) error correction code (ECC) on respective DWAB segments of the plurality of DWAB segments to generate a plurality of sets of DWAB parity bits (DWAB-PB)

106
Concatenate respective DWAB-PB to the corresponding data block to generate corresponding forward-error-correction (FEC) blocks, the FEC blocks do not include the burst-write address or the hash of the burst-write address (Opt., the FEC blocks do not include a poison-indication bit)

107
Send a burst-write command and a respective portion of a respective FEC block of the plurality of FEC blocks to respective memory devices of a plurality of memory devices during each of a plurality of beats until all of the beats of the burst-write have been sent

108
When performing a burst-read of the one or more FEC blocks responsive to a burst-read instruction that includes a burst-read address, identify read-address errors using the burst-read address and the DWAB-PB in the one or more FEC blocks. When a read-address error is identified, corrective action is taken (Optionally, when the DWAB segments include a poison-indication bit, identify poison-bit-indicated errors using the burst-read address and the DWAB-PB in the one or more FEC blocks. When a poison-bit-indicated error is identified, corrective action is taken.

FIG. 2

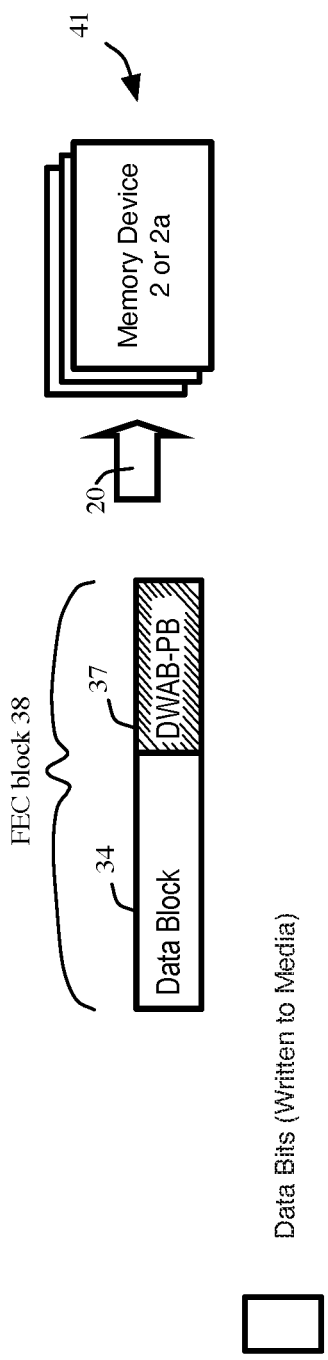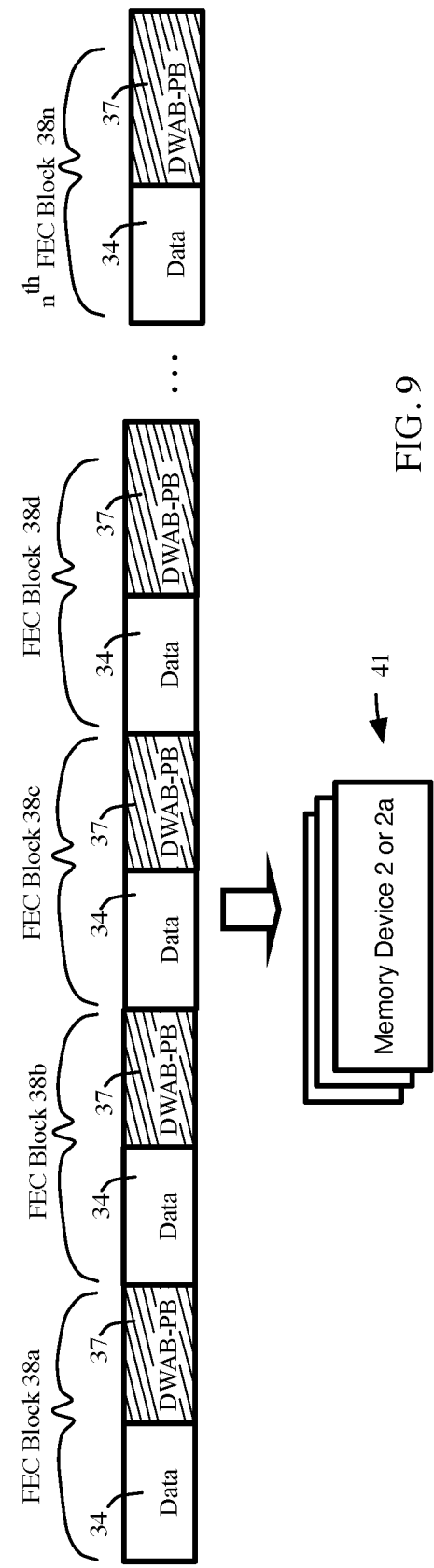
FIG. 8
FIG. 9

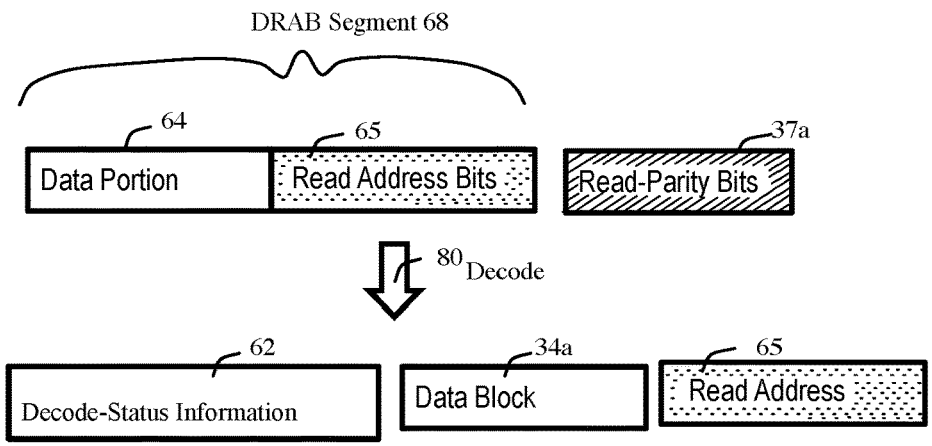
FIG. 13A
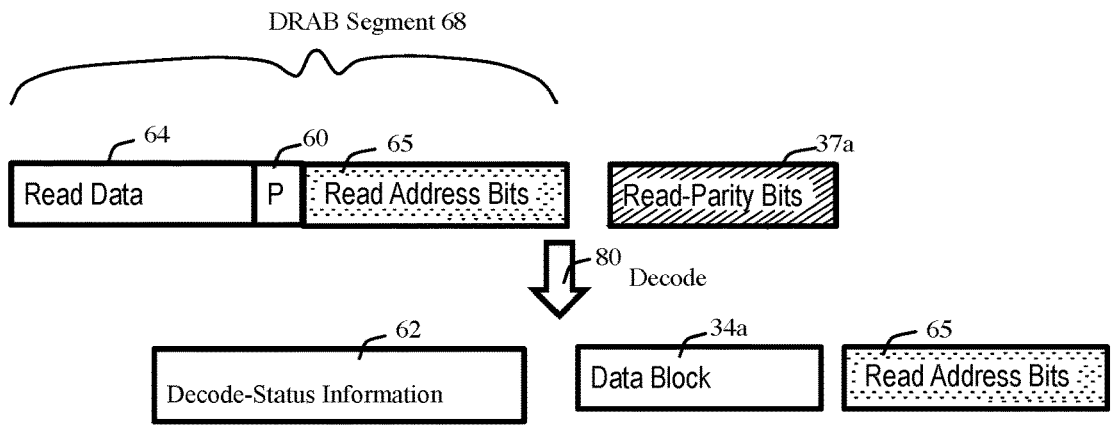
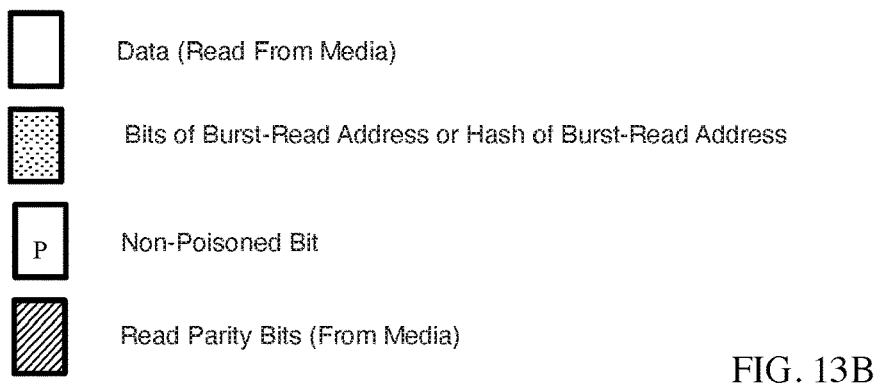
FIG. 13B

MEMORY ADDRESS PROTECTION

RELATED APPLICATIONS

The present Application claims the benefit under 35 U.S.C. § 119 of the priority date of U.S. Provisional Patent Application Ser. No. 63/195,618 filed on Jun. 1, 2021, the entire contents of which are incorporated by reference as if fully set forth herein.

BACKGROUND

Random access memory (RAM) is a widely used type of semiconductor memory, and includes dynamic RAM (DRAM), synchronous DRAM (SDRAM) and double data rate (DDR) SDRAM that transfers data on both the rising edge and the falling edge of each clock pulse. Some DDR SDRAM such as, for example, DDR4 SDRAM and DDR5 SDRAM are operable as burst oriented memories. In the burst mode, these DDR SDRAMs facilitate high speed and high throughput data transfers. For example, processor instructions that need to access data from the DDR SDRAM present the address thereto in a read request instruction and then wait for the requested information over a time, which is consistent with the clock speed at which the memory runs. Upon locating of a first block of the requested data, a number (e.g., 32) of bytes in the immediate vicinity surrounding the first block are transferred in the same transaction as a 'burst' of memory activity. Similarly, to write data, a number (e.g., 32) of bytes in the immediate vicinity surrounding the first block are written in the same transaction as a 'burst' of memory activity.

DDR SDRAM iterations that allow for burst read and write operations such as DDR4 SDRAM and DDR5 SDRAM are desirable as they can operate at higher bit rates and/or frequencies than earlier generations of DDR SDRAM devices. However, such memories are subject to faulty read address events such as address line errors in which unwanted data is recovered from an incorrect address.

Some address line errors arise from a one-bit (1-bit) flip somewhere on the affected read address. A 1-bit flip can have catastrophic consequences in the context of reliable operations of data centers and other entities running substantial amounts of data traffic. In such contexts, consistent detection of the address line errors is needed to prevent the origin and subsequent promulgation of such errors. Error correction is used to prevent or ameliorate these and related issues.

Address errors, sometimes referred to "address-line" errors or as a "misaddress," occur when the read retrieves data from the read operation that is not the data that was intended to be retrieved by the read instruction as a result of a mismatch between the burst-write address and the read address that was used to perform a particular read operation.

Some errors occur during the process of writing the data to the DDR SDRAM, that may be referred to as "burst-write-related errors." These types of errors can occur as a result of a mismatch between the burst-write address and the address that was used to perform a particular write operation or as a result of some other error in the write process. A "poison-bit" marker is sometimes used to mark a DDR SDRAM burst as "broken," meaning that the burst is known to be faulty in relation to an address line error (or other error) and the data is thus known to be corrupt relative to the processor's data request at the time that the data is being written. A burst-write-related error or other error known at the time of the write process may be referred to collectively as a "poison-bit-indicated error" when a poison bit marker is used to identify the particular error.

Conventional error correction approaches have used a single bit from the Error Correction Control (ECC) parity field to denote a poison-bit marker. Using the parity field bit to mark a poison bit is undesirable as the number of bits available for ECC are reduced. Another conventional approach flips a number of bits from the burst block as a poison-bit marker. These conventional approaches can result in a marked block that will not decode properly, but that is indistinguishable from a normal undecodable block (e.g., a block having too many errors). In effect, the conventional approaches thus "lose" the poison-bit marker itself. Not only can these approaches result in a completely bad block that cannot be corrected, but also the marked block is subject to false correction. More particularly, the marked block can be erroneously marked "good," but actually include totally incorrect data. As used herein, the term "false correction" relates to marking a burst block for processing as including uncorrupted data corresponding to a memory address in its header, but in reality including data unrelated to the given address, which is thus worthless and/or counterproductive for continued processing.

Another situation that can cause false correction is mis-address errors occurring when the read retrieves data from the read operation that is not the data that was intended to be retrieved by the read instruction as a result of a mismatch between the burst-read address and the read address that was used to perform a particular read operation, that can be referred to as a burst-read-related error. This can occur as a result of a mismatch between the burst-read address and the read address that was used to perform a particular read operation.

Accordingly, there is a need for a method and apparatus that will allow identification of, and correction of address errors and poison-bit-indicated errors, to reduce the chances of uncorrectable errors resulting from poison block marking and false corrections, while not limiting the number of bits available to store ECC parity bits.

BRIEF DESCRIPTION

A method for memory protection is disclosed that includes receiving a burst-write instruction. The burst-write instruction includes data and a burst-write address. The data is segmented into a plurality of data blocks. One or more bits of the burst-write address, or a hash of the burst-write address, are concatenated to respective data blocks of the plurality of data blocks to obtain a plurality of data-and-write-address-bit (DWAB) segments. A Single Error Correction Double Error Detection (SECDED) error correction code (ECC) is executed on respective DWAB segments of the plurality of DWAB segments to generate a corresponding plurality of sets of parity bits (DWAB-PB). Respective DWAB-PB are concatenated to the corresponding data block to generate corresponding forward-error-correction (FEC) blocks. None of the FEC blocks include the burst-write address or the hash of the burst-write address. A burst-write command and a respective portion of a respective one of the FEC blocks is sent to respective ones of a plurality of memory devices during respective beats of a plurality of beats until all of the beats of the burst-write have been sent.

In one implementation the concatenating one or more bits of the burst-write address, or a hash of the burst-write address further comprises concatenating a poison-indication bit and one or more bits of the burst-write address or a hash of the burst-write address, to respective data blocks of the plurality of data blocks to obtain the plurality of DWAB segments. None of the FEC blocks include the poison-indication bit, the burst-write address or the hash of the burst-write address.

A method for memory protection includes performing a burst-read in response to receiving a burst-read instruction that includes a burst-read address by sending a burst-read command to a plurality of memory devices and receiving in response a plurality of read-forward-error-correction (read-FEC) blocks. The read-FEC blocks are segmented to obtain a plurality of data portions and a plurality of corresponding DWAB-PB. One or more bits of the burst-read address, or a hash of the burst-read address are concatenated to respective data portions of the plurality of data portion to obtain a plurality of data-and-read-address-bit (DRAB) segments. Respective ones of the plurality of DRAB segments are decoded using the corresponding DWAB-PB and a Single Error Correction Double Error Detection (SECDED) decode operation to identify, for respective DRAB segments, a data block and when a Single Event Correction (SEC) has occurred, the bit position of the corrected bit. A read-address error is determined to have occurred when a SEC has been made to a bit position corresponding to the one or more bits of the burst-read address, or a hash of the burst-read address. When the read-address error has occurred the method includes: indicating that an address error has occurred, requesting retransmission of the burst-read instruction, or indicating that an address error has occurred and requesting retransmission of the burst-read instruction.

An integrated circuit (IC) device includes a memory controller to receive a burst-write instruction. The burst-write instruction includes data and a burst-write address. The memory controller segments the data into a plurality of data blocks. One or more bits of the burst-write address or one or more bits of a hash of the burst-write address are concatenated to each of the plurality of data blocks to obtain a plurality of data-and-write-address-bit (DWAB) segments. A Single Error Correction Double Error Detection (SECDED) Error Correction Code (ECC) is executed on respective DWAB segments of the plurality of DWAB segments to generate corresponding sets of parity bits (DWAB-PB). The respective set of parity bits is concatenated to the corresponding data block to generate corresponding forward-error-correction (FEC) blocks. None of the FEC blocks include the one or more bits of the burst-write address or the one or more bits of the hash of the burst-write address. A burst-write command and a respective portion of a respective one of the FEC blocks is sent to individual ones of a plurality of memory devices during respective ones of a plurality of beats until all of the beats of the burst-write have been sent.

The methods and apparatus of the present invention allow for protection of reads of memory devices from address errors and poison-bit-indicated errors by effectively identifying address errors when they occur, and allowing for poison-bit marking of poison-bit-indicated errors in such a way so as not to reduce the number of bits available to store ECC parity bits.

BRIEF DESCRIPTION OF THE DRAWINGS

Some illustrative aspects, features and elements related to example implementations of the present disclosure are described herein with reference to the following description and drawings. Various ways in which the principles disclosed herein are practically implementable are thus described, and all aspects and equivalents thereof are intended to fall within the scope of the claimed subject matter. The foregoing, and other features and uses of the present disclosure, become more apparent in view of the following description in conjunction with each enumerated figure (FIG.) of the accompanying drawings. Throughout the specification of the present disclosure, the like reference numerals (as shown in each FIG. of the drawings) generally refer to the like components, features and/or elements.

FIG. 2 depicts a flowchart of a method for memory protection.

FIG. 8 illustrates an example of generating a FEC block and storing the FEC block.

FIG. 9 illustrates an example of storing FEC blocks on memory devices.

FIG. 13A illustrates an example of decoding a DRAB segment.

FIG. 13B illustrates an example of decoding a DRAB segment that includes a poison-indication bit.

DETAILED DESCRIPTION

Figure 1:
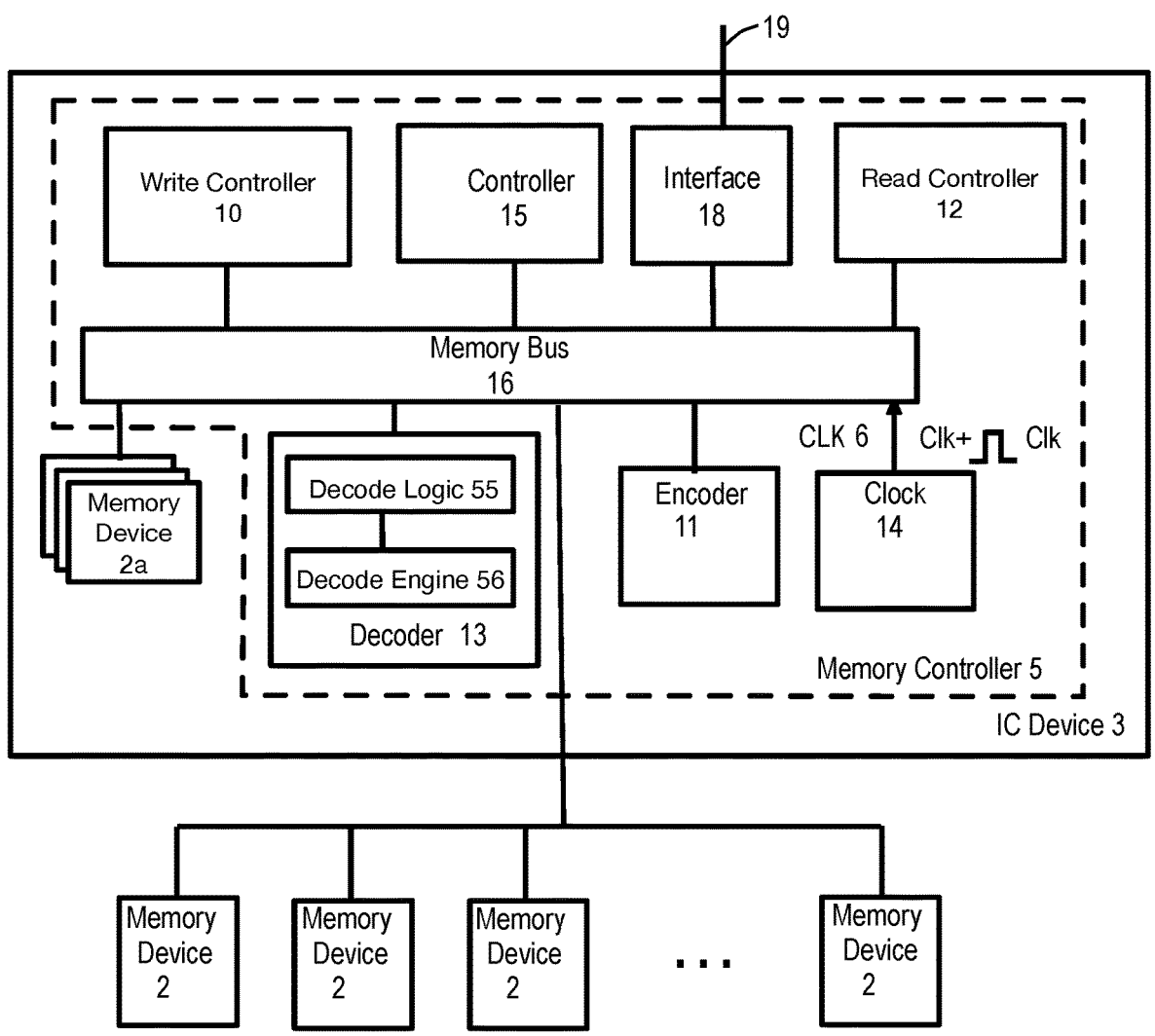
FIG. 1 depicts a memory system.

FIG. 1 shows a system 1 that includes an IC device 3 and memory devices 2. IC device 3 includes a memory controller 5 and memory devices 2a that are coupled to memory controller 5. The memory devices of system 1 can be external to IC device 3 (e.g., memory devices 2) or internal to IC device 3 (memory devices 2a), or both internal (memory devices 2a) and external (memory devices 2) to IC device 3. Memory controller 5 includes write controller 10, encoder 11, read controller 12, decoder 13, clock 14, controller 15, memory bus 16 and interface 18. Interface 18 allows IC device 3 to communicatively couple with one or more external devices (or other entities) external to IC device 3. In the present example, interface 18 includes an input and output (I/O) link 19 that allows for communication with external devices such as, for example, a host computing system.

Memory bus 16 communicatively couples one or more of write controller 10, encoder 11, read controller 12, decoder 13, clock 14, controller 15, interface 18 and memory devices 2-2a and thus allows data transmission between any and all of these components. Controller 15 controls one or more of write controller 10, encoder 11, read controller 12, decoder 13, clock 14, memory bus 16, interface 18 and memory devices 2-2a.

Clock 14 generates a clock signal (CLK) 6, with which memory operations of the device are synchronized. In an example implementation, memory devices 2, memory devices 2a or both memory devices 2 and memory devices 2a are operable as a DDR SDRAM, and clock 14 clocks the IC device 3 at its rising edge 'Clk+' and again at its falling edge 'Clk−'. Two (2) consecutive words are thus transferrable on each CLK 6; a first of the words on the rising edge thereof Clk+, and a second of the words on the falling edge thereof Clk−. Example implementations of memory devices 2-2a include DDR4 SDRAM and/or DDR5 SDRAM, without limitation. In an alternative implementation, the CLK 6 is provided from an external clock source.

Decoder 13 includes a decode engine 56 and decode logic 55 that are coupled together. In one example decode engine 56 performs a decoding operation (e.g., a SECDED decoding operation) on input received from decode logic 55. In the present example, one or more of memory controller 5, write controller 10, encoder 11, read controller 12, decoder 13, clock 14, controller 15, memory bus 16 and interface 18 include software, hardware (e.g., can include a processor) firmware or a combination of software and hardware for performing tasks such as some or all of the steps of the methods 100, 200 shown below.

FIG. 2 shows a flowchart of a method 100 for memory protection. In one example, memory controller 5 of FIG. 1 performs all of the steps of method 100. In the following discussion of methods 100 and 200, the memory devices 2-2a that are written to, or read from may be internal, external or both internal and external to the IC device that is performing some or all of the steps of the particular method 100 or method 200, described further below. FIG. 1 illustrates a system 1 in which memory devices are shown as being both internal (memory devices 2a) and external (memory devices 2) so as to illustrate the various ways memory devices can be implemented in system 1. Though system 1 can include both internal memory devices 2a and external memory devices 2, alternatively, system 1 only includes memory devices 2 that are external to IC device 3 (i.e., system 1 does not include memory devices 2a) and the reads and writes of methods 100 and 200 are only performed on memory devices 2. In another example, system 1 only includes internal memory devices 2a (i.e., system 1 does not include memory devices 2) and the reads and writes of methods 100 and 200 are only performed on memory devices 2a.

Figure 3:
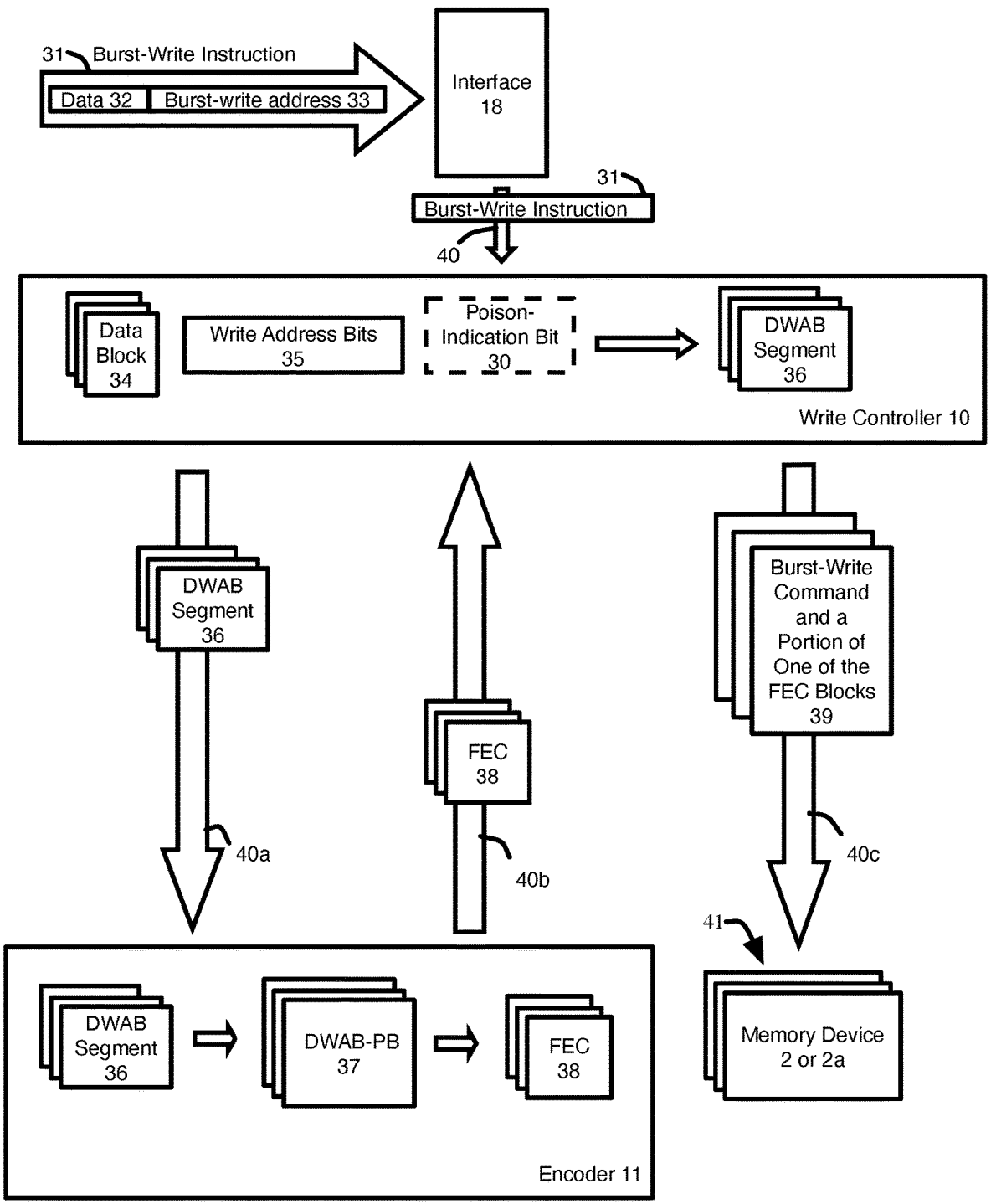
FIG. 3 illustrates functions of some of the structures of the memory system.

A burst-write instruction is received (101). The burst-write instruction includes data and a burst-write address. In FIG. 1 the burst-write instruction is received (e.g., from a host computer) over I/O link 19 of interface 18 and is coupled to write controller 10 through memory bus 16. FIG. 3 shows an example of a burst-write instruction 31 that includes data 32 and a burst-write address 33. In this example burst-write instruction 31 is received at interface 18, coupled through memory bus 16 to write controller 10 as illustrated by arrow 40.

In the following discussion communications indicating that a burst-write or a burst-read are to be performed can be referred to as an "instruction" or as a "command." There is no difference between the meaning of the term "instruction" and the term "command" as used in the present application. However, for the sake of distinguishing between incoming and outgoing instructions/commands the term "instructions" will be used for incoming requests to the IC to perform a read or write and the term "command" will be used to refer to requests to memory devices to perform a read or write.

The data are segmented (102) into a plurality of data blocks. In FIG. 3 write controller 10 segments the data 32 into a plurality of data blocks 34. In one example (102), the data 32 are segmented into a number of data blocks 34 equal to the number of beats of the burst-write. In one example, data 32 are segmented into a plurality of 64-bit data blocks 34. Alternatively, the data 32 are segmented into larger or smaller blocks, such as, for example, 128-bit or 256-bit blocks, without limitation.

One or more bits of the burst-write address, or a hash of the burst-write address are concatenated (103) to respective data blocks of the plurality of data blocks to obtain a plurality of data-and-write-address-bit (DWAB) segments 36. Each of the plurality of DWAB segments corresponds to a respective one of the plurality of data blocks 34. The term "concatenate," as used herein, is meant to include linking together the structures indicated to be concatenated. The write address bits 35 may be concatenated to the end of the respective data block 34, to the beginning of the respective data block 34 or at a predetermined location within the respective data block 34. In FIG. 1 memory controller 5 performs the concatenation of step 103 (e.g., one or more of write controller 10, controller 15 and encoder 11 perform the concatenation). When a hash of the burst-write address is used, write controller 10, controller 15 and/or encoder 11, compute the hash of the burst-write address. In the example shown in FIG. 3, write controller 10 concatenates the one or more bits of the burst-write address, or a hash of the burst-write address to each of data blocks 34 to obtain DWAB segments 36. The one or more bits of the burst-write address, or a hash of the burst-write address may be referred to hereinafter as "write address bits" and are illustrated in FIG. 3 as write address bits 35. The term "write address bits," as used in the present application, includes one or more bits of a burst-write address, or a hash of a burst-write address. In the example shown in FIG. 3, write controller 10 outputs the DWAB segments 36 as shown by arrow 40a to encoder 11.

Figure 4A:
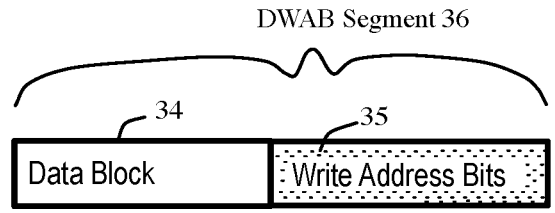
FIG. 4A depicts an example of a DWAB segment.

FIG. 4A shows an example of DWAB segment 36 that includes the data block 34. In this example write address bits 35 have been concatenated to the end of data block 34. However, it is appreciated that, alternatively, DWAB segment 36 could include write address bits 35 that are concatenated to the beginning of data block 34, or alternatively dispersed at predetermined locations within DWAB segment 36 such that they are dispersed between various bits of data block 34.

Optionally step 103 includes concatenating (104) or more bits of the burst-write address, or a hash of the burst-write address, and a poison-indication bit to the respective data blocks of the plurality of data blocks to obtain the plurality of DWAB segments. The term "poison-indication bit," as used in the present application is a bit that identifies a block having a known write-address error or other error at the time of the concatenation of step 104 such as a "broken" DDR SDRAM burst. The term "poisoned bit", as used in the present application is a poison-indication bit having a value that indicates that the particular bit has been marked as being part of a burst having an error (e.g., an uncorrectable block). The term "non-poisoned bit", as used in the present application is a poison-indication bit having a value that indicates that the particular bit has not been marked as being part of a burst having an error. Accordingly, each poison-indication bit will either be a poison-bit (having a poison-bit value) or a non-poisoned bit (having a non-poisoned-bit value). The term "poison-bit-indicated error," as used in the present application, is an error that cannot be corrected by simply decoding the block such as a write-address error or other type of error, and refers to whatever error or errors that are the cause of the marking of the poison-indication bits of a particular burst-write to be poison bits.

In the example shown in FIG. 3 write controller 10 couples DWAB segments 36 to encoder 11 and encoder 11 generates the poison-indication bit 30 and concatenates the write address bits 35 and the poison-indication bit 30 to each data block 34 to form DWAB segments 36 that include the poison-indication bit 30. In this example, encoder 11 generates poison-indication bit 30. In one example the DWAB segment coupled from write controller 10 to encoder 11 includes a non-poisoned bit as a placeholder and encoder 11 changes the value of the received non-poisoned bit to a poison-bit value when the DWAB segment 36 is to be marked as a poisoned bit, thereby completing the formation of the DWAB segment 36 at encoder 11. When the burst-write does not have an error, the poison-indication bit 30 in each DWAB segment 36 in the burst-write is set to a first value (e.g., "0"), that may be referred to as a non-poisoned-bit value. The non-poisoned-bit value indicates that the burst-write does not have an error that cannot be corrected by simply decoding the block (i. e. the burst-write does not have an uncorrectable error), i.e. that the poison-indication bit 30 is a non-poisoned bit. When the burst-write does have an error, the poison-indication bit 30 in each DWAB segment 36 in the burst-write is set to a second value that is different from the first value (e.g., "1"), that may be referred to as a poisoned bit value. The poison-bit value indicates that the burst-write has an error that cannot be corrected by simply decoding the block (i. e. the burst-write has an uncorrectable error) i.e. that the poison-indication bit 30 is a poisoned bit.

Figure 4B:
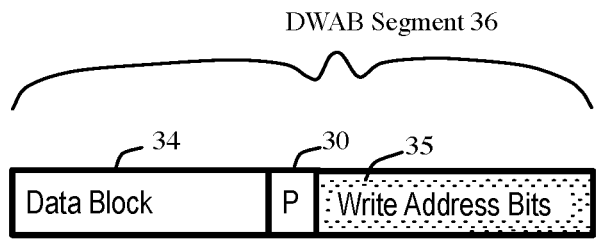
FIG. 4B depicts an example of a DWAB segment that includes a poison-indication bit.

FIG. 4B shows an example in which a poison-indication bit 30 has been concatenated to the end of data block 34 to form DWAB segment 36. However, it is appreciated that, alternatively, write address bits 35 could be concatenated to the beginning of data block 34, or alternatively dispersed within DWAB segment 36 such that it is dispersed between various bits of data block 34. Similarly, poison-indication bit 30 could be concatenated to the beginning of data block 34, concatenated to the end of write address bits 35 or alternatively dispersed between bits of data block 34 or write address bits 35.

A single error correction double error correction (SECDED) error correction code (ECC) is executed (105) on respective DWAB segments of the plurality of DWAB segments to generate a plurality of sets of DWAB parity bits (DWAB-PB). In the example of FIG. 3, encoder 11 receives the DWAB segments 36 and executes a SECDED ECC operation on each DWAB segment 36 to generate a corresponding set of parity bits for each DWAB segment 36, illustrated as DWAB-PB 37.

Figure 5A:
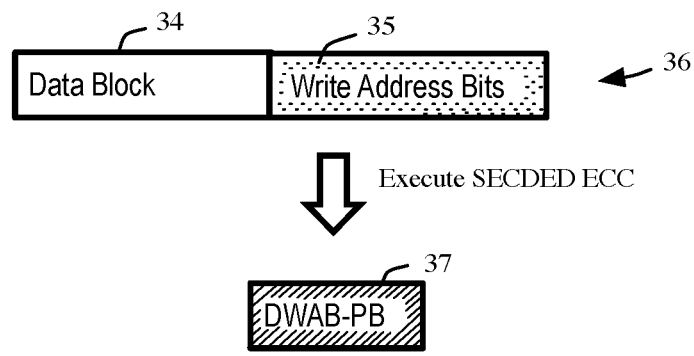
FIG. 5A illustrates an example of execution of an ECC on the DWAB segment of FIG. 4A.

FIG. 5A shows an example in which DWAB segment 36 includes data block 34 and address bits 35, and in which the SECDED ECC operation of step 105 forms a DWAB-PB 37. In this example, data bits 34 and address bits 35 are reflected in DWAB-PB 37.

Figure 5B:
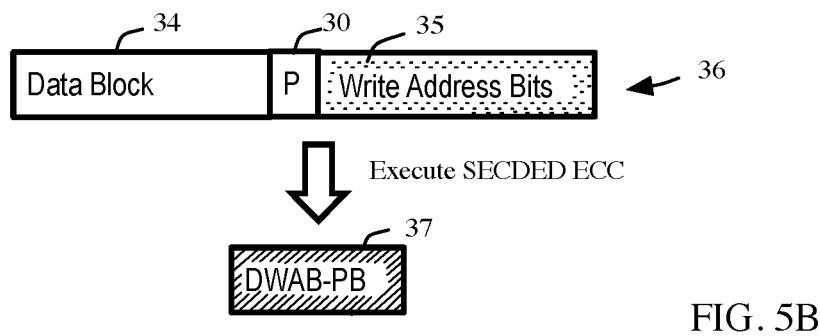
FIG. 5B illustrates an example of execution of an ECC on the DWAB segment of FIG. 4B.

FIG. 5B shows an example in which the concatenation of step 104 forms DWAB segment 36 that includes data block 34, poison-indication bit 30 and address bits 35, and in which the SECDED ECC operation of step 105 forms a DWAB-PB 37. In this example data bits 34, poison-indication bit 30 and address bits 35 are reflected in DWAB-PB 37.

In one example, the SECDED ECC operation performed in step 105 is performed on a DWAB segment 36 having write address bits 35 that include the entire burst-write address 33. When a simpler SECDED ECC scheme is used, the maximum size of the FEC block is in some cases too small to include the entirety of the burst-write address 33, which may be, for example, a 40-bit address. In this case, an example implementation includes a portion, e.g., a subset of the bits of burst-write address 33s, or a hash-table version of the burst-write address 33, instead of the full burst-write address 33. In this example the SECDED ECC performed in step 105 is performed on a DWAB segment 36 having write address bits 35 that include a hash of the burst-write address 33 received in step 101, the hash having a number of bits that is less than the number of bits in the entire burst-write address 33.

Figure 6:
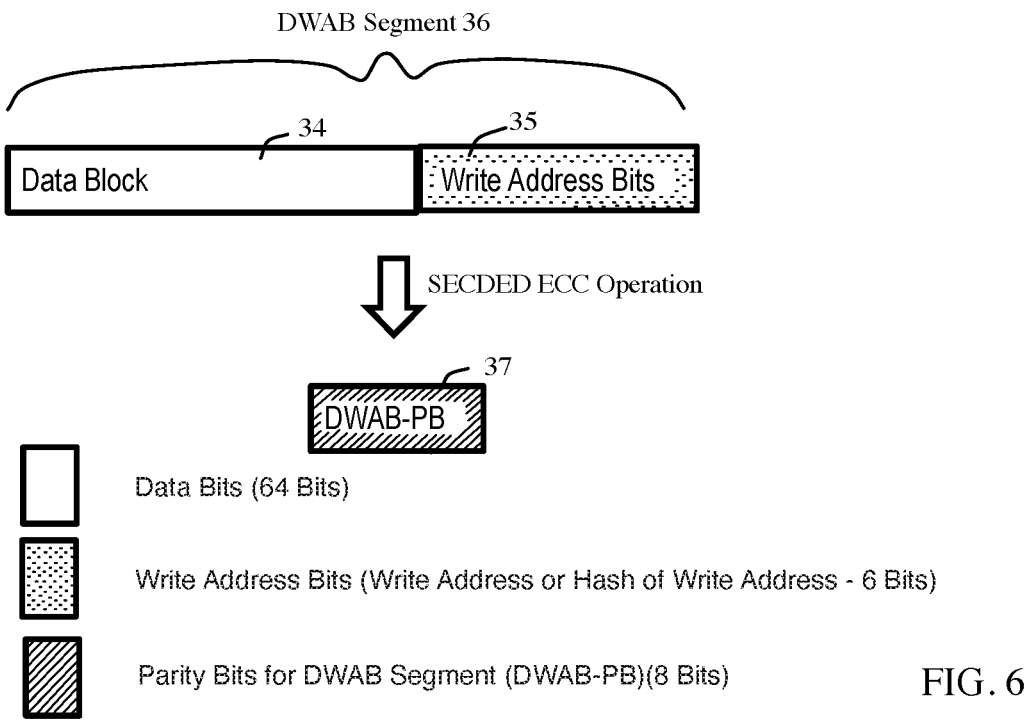
FIG. 6 illustrates an example execution of a SECDED ECC on a DWAB segment.

FIG. 6 shows an example in which data block 34 includes 64 data bits and write address bits 35 includes 6 address bits (e.g., 6 of the bits in the burst-write address 33 or a hash of burst-write address 33), and in which each SECDED ECC operation performed in step 105 forms a DWAB-PB having 8 parity bits.

Figure 7:
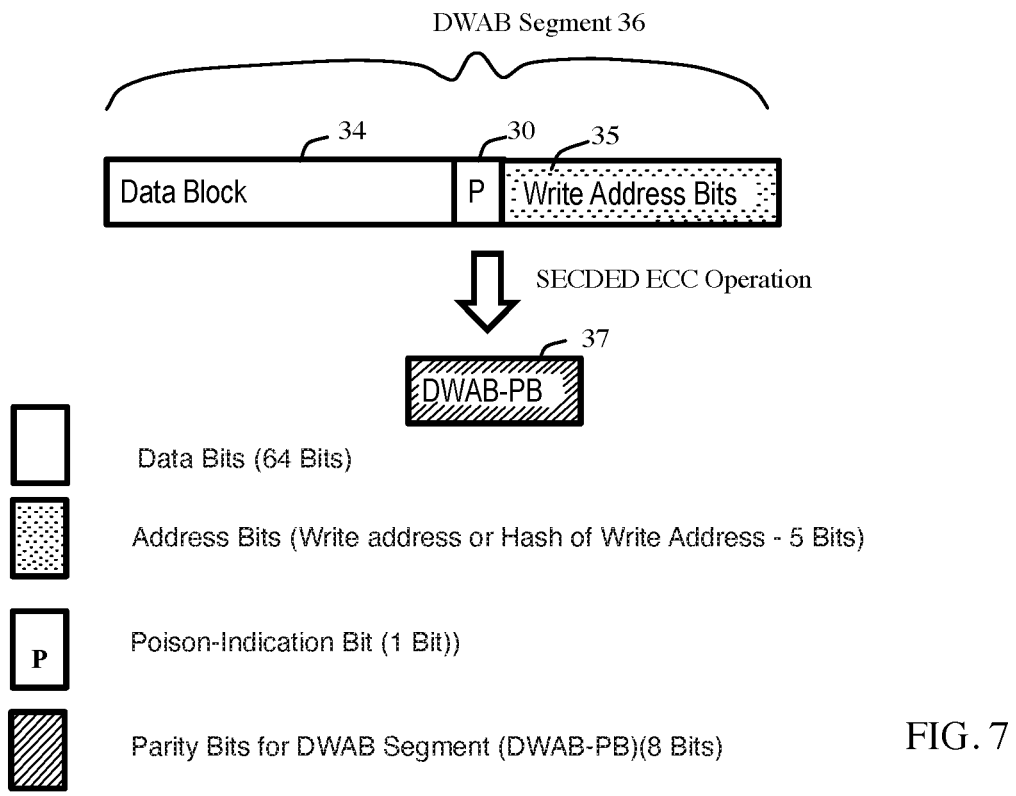
FIG. 7 illustrates an example execution of a SECDED ECC on a DWAB segment that includes a poison-indication bit.

FIG. 7 shows an example in which DWAB segment 36 includes a poison-indication bit 30, a data block 34 having 64 data bits and write address bits 35 having 5 bits (e.g., 5 of the bits in the burst-write address 33 or a hash of burst-write address 33, and in which each SECDED ECC operation performed in step 105 forms a DWAB-PB 37 having 8 parity bits.

The sets of parity bits, i.e. the DWAB-PB, generated in step 105 are concatenated (106) to the corresponding data blocks to generate corresponding forward error correction (FEC) blocks 38. FIG. 8 shows an example of a FEC block 38 formed by the concatenation of step 106. FEC block 38 does not include the burst-write address or the hash of the burst-write address (106). Also, when DWAB-PB 37 is formed by performing an SECDED ECC on a DWAB segment 36 that includes poison-indication bit 30 as shown in FIG. 5B, the corresponding FEC blocks 38 do not include poison-indication bit 30 (106). In FIG. 3 encoder 11 concatenates respective DWAB-PB 37 to the corresponding data block 34, where the data block 34 is obtained from the DWAB segment 36, to generate corresponding FEC blocks 38. In FIG. 8 DWAB-PB 37 have been concatenated to the end of data block 34. However, it is appreciated that, alternatively, FEC block 38 could include DWAB-PB 37 that are concatenated to the beginning of data block 34, or alternatively dispersed within FEC block 38 such that parity bits of DWAB-PB 37 are dispersed between various bits of data block 34.

A burst-write command and a respective portion of a respective one of the FEC blocks 38 of the plurality of FEC blocks 38 are sent (107) to respective ones of a plurality of memory devices during respective ones of a plurality of beats until all of the beats of the burst-write have been sent. In the example shown in FIGS. 8-9 a burst-write command and a respective portion of a respective FEC block 38 are sent to the media to be written to, illustrated as media 41, that can include memory devices 2, memory devices 2a or both memory devices 2 and 2a.

FIG. 9 shows an example of a burst-write stored on media 41 that includes n FEC blocks 38a-38n, stored on memory devices 2 or 2a. In one example n is 16 such that 16 FEC blocks 38 are stored in a single burst-write. In another example n is 8 such that 8 FEC blocks 38 are stored in the single burst-write. It is to be noted that none of the FEC blocks 38a-38n in the burst-write include the one or more bits of the burst-write address 33, the one or more bits of a hash of the burst-write address 33 or the poison-indication bit 30.

In one example burst-write instruction 31 is a DDR-burst-write instruction and the number of data blocks, the number of FEC blocks (n) and the number of the plurality of beats are equal to eight. In another example, the number of data blocks, the number of FEC blocks (n) and the number of the plurality of beats are equal to sixteen. In the example of FIG. 3, encoder 11 sends the FEC blocks 38 to write controller 10 as shown by arrow 40b. In response to receiving FEC blocks 38, write controller 10 sends a burst-write command and a respective portion of one of the FEC blocks (illustrated as block 39) to respective ones of the plurality of memory devices 2 or 2a as illustrated by arrow 40c until all of the plurality of FEC blocks in the burst-write have been sent to media 41.

Figure 10A:
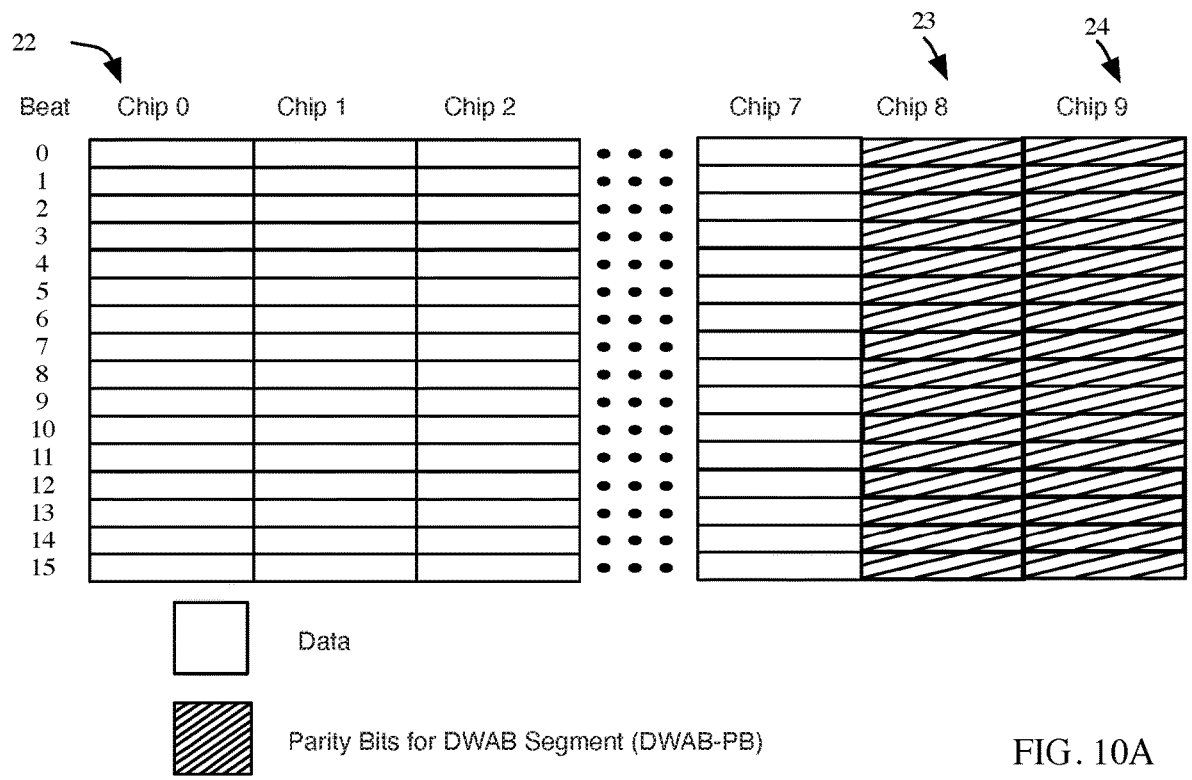
FIG. 10A illustrates an example of storing FEC blocks on memory devices in a burst having sixteen beats such that all parity bits are stored on two individual memory devices.

In the examples shown in FIG. 10A a FEC block is formed every beat. In this example DDR burst 22 has 16 beats, numbered '0' through '15'. In each beat, four (4) bits of data are stored in each of eight (8) chips (e.g., DDR-5 memory devices), numbered '0' through '7' and parity bits are stored in a ninth chip 23, numbered '8' and a tenth chip 24 numbered '9'. In one example 8 bits of parity are stored on each beat (e.g., in each beat 4 parity bits are stored in chip 23 and 4 parity bits are stored in in chip 24).

Figure 10B:
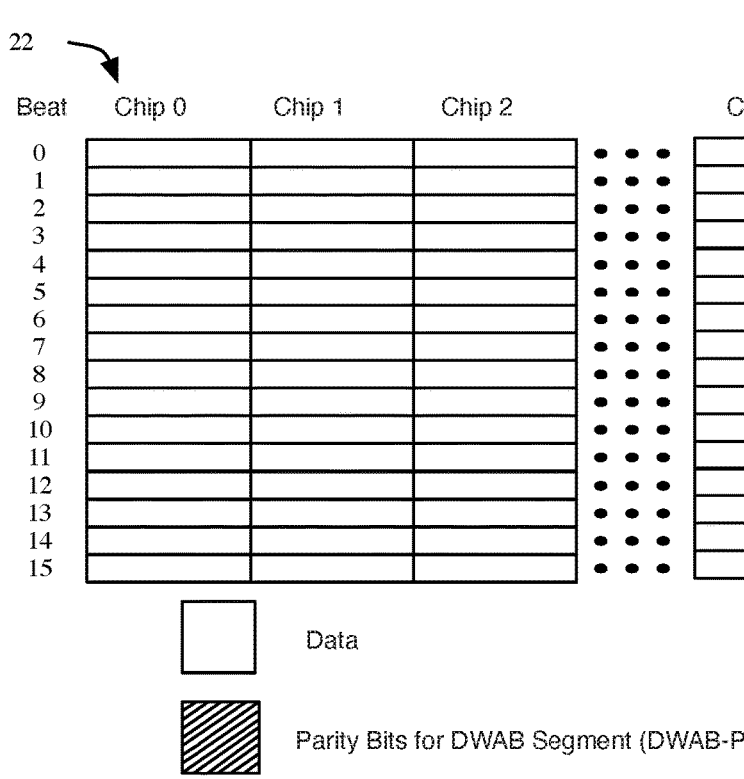
FIG. 10B illustrates an example of storing FEC blocks on memory devices in a burst having sixteen beats such that all parity bits are stored on a single memory device.

FIG. 10B shows an example in which two beats are used to form each FEC block 38 and in which parity is stored in a single chip. In this example, burst 22 stores data and ECC in nine chips (e.g., 9 DDR-5 memory devices), with data stored in eight chips and parity bits stored in ninth chip 23. In one example each DWAB segment includes 8 bits of parity (e.g., 4 parity bits stored in each beat).

Figure 10C:
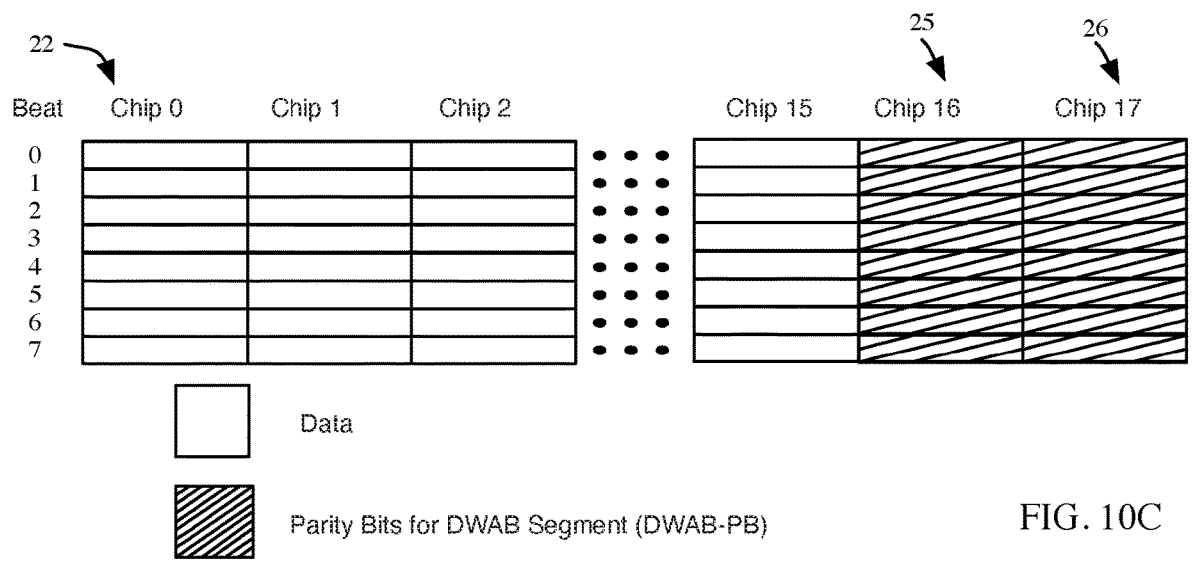
FIG. 10C illustrates an example of storing FEC blocks on eighteen memory devices in a burst having eight beats.

In the example shown in FIG. 10C an entire FEC block 38 is stored on each beat using a DDR burst 22 having 8 beats, numbered '0' through '7' for storing data and parity bits of DWAB-PB 37 on eighteen chips. In this example four (4) bits of data are stored in each of sixteen (16) chips (e.g., DDR-4 memory devices), numbered '0' through '15' with parity bits of DWAB-PB 37 stored in a seventeenth chip (chip 16) 25 and eighteenth chip (chip 17) 26. In one example each DWAB segment includes 8 bits of parity (e.g., in each beat 4 parity bits are stored in chip 25 and 4 parity bits of parity are stored in chip 26).

Figure 10D:
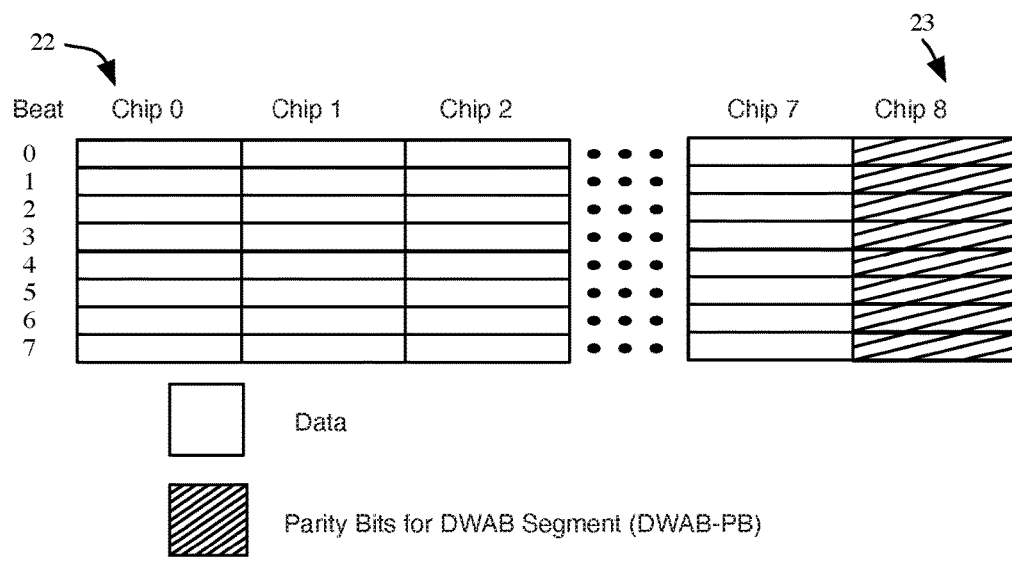
FIG. 10D illustrates an example of storing FEC blocks on nine memory devices in a burst having eight beats.

In the example shown in FIG. 10D an entire FEC block 38 is stored on each beat using a DDR burst 22 having 8 beats, numbered '0' through '7' for storing data and parity bits of DWAB-PB 37 on nine chips. In this example, in each beat eight bits of data are stored in each of eight chips (e.g., DDR-4 memory devices), numbered '0' through '7' with parity bits stored in a nineth chip (chip 8) 23. In one example each DWAB segment includes 8 bits of parity (e.g., in each beat 8 parity bits are stored in chip 23).

In the examples shown in FIGS. 10A-10D data and parity are contiguous, with parity bits stored on particular chip(s) and data stored on other chips. However, alternatively, parity bits could be interleaved with data bits and not stored on particular chip(s). Though the above examples use 8 parity bits, it is appreciated that, alternatively, more or fewer parity bits could be used.

When performing reads of the one or more FEC blocks responsive to a burst-read instruction that includes a burst-read address, optionally read-address errors are identified (108) using the burst-read address and the DWAB-PB in the one or more FEC blocks. When a read-address error is identified, corrective action is taken. Optionally, when the DWAB segments include a poison-bit indication, poison-bit-indicated errors are identified using the burst-read address and the DWAB-PB in the one or more FEC blocks, and when a poison-bit-indicated error is identified corrective action is taken. In one example, step 108 of FIG. 1 is performed using some or all of the steps of method 200 shown in FIG. 11.

Figure 11:
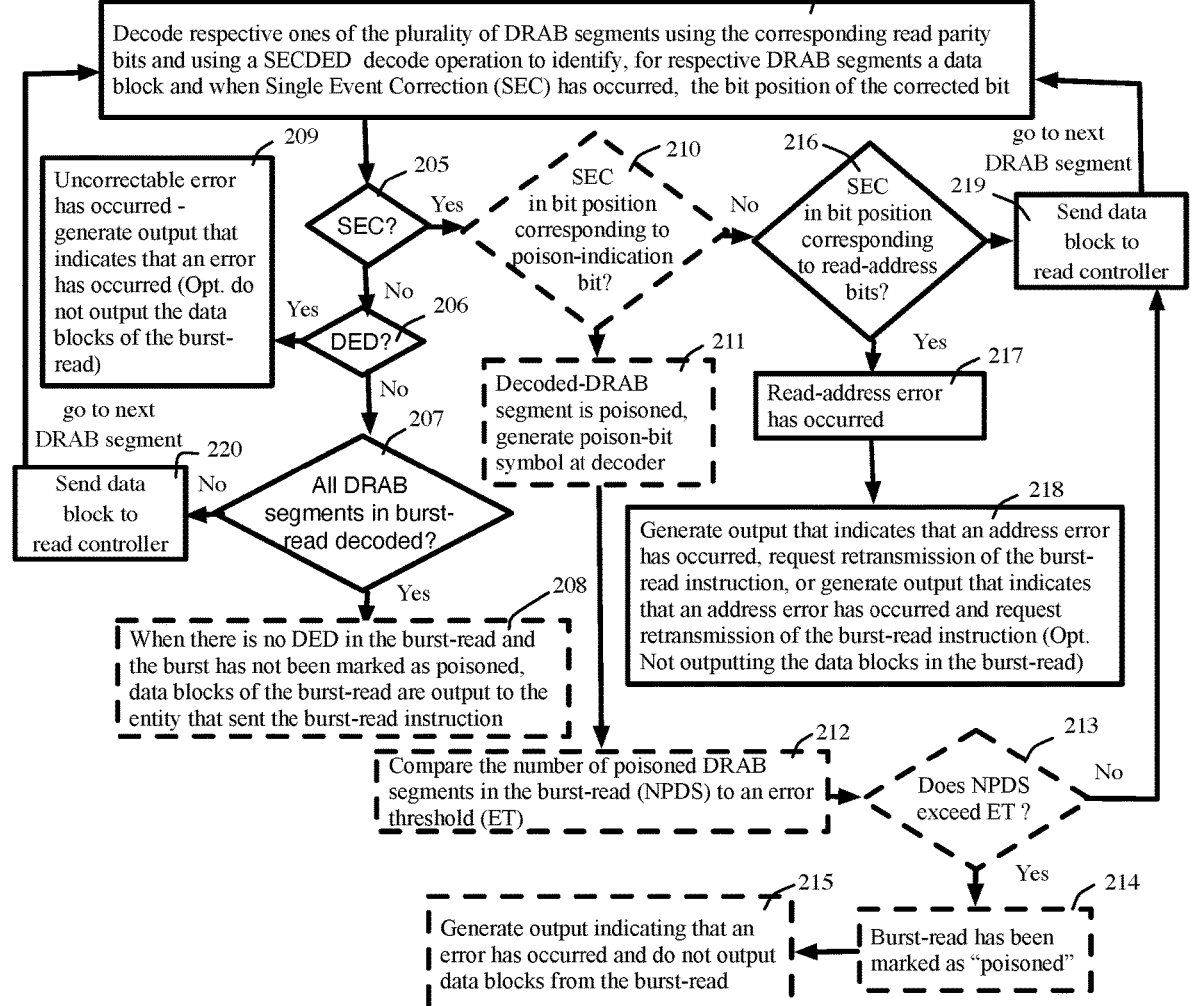
FIG. 11 depicts a flowchart of an example method for memory protection.

FIG. 11 illustrates a method 200 for memory protection. Method 200 can be performed independently of method 100. Alternatively, some or all of the steps of method 100 and method 200 are performed. In one example, memory controller 5 of FIG. 1 performs all of the steps of method 200.

A burst-read is performed (201), in response to receiving a burst-read instruction that includes a burst-read address, by sending a burst-read command to a plurality of memory devices and receiving in response a plurality of read-FEC blocks. In the example shown in FIG. 1, read controller 12 performs the burst-read operation in response to receiving a burst-read instruction that includes a burst-read address, by sending a burst-read command to a plurality of memory devices 2 or 2a, and read controller 12 receives in response a plurality of read-FEC blocks. In the example shown in FIG. 12, a burst-read instruction 61 is received at interface 18 that includes a burst-read address 63. The burst-read instruction 61 is coupled through interface 18 to read controller 12 as shown by arrow 57. Upon receiving the burst-read read instruction at read controller 12, read controller 12 sends a burst-read command 66 to the media 41 to be read as is illustrated by arrow 57a. In response, the read controller 12 receives a plurality of read-FEC blocks 67 as illustrated by arrow 57b. In one example, media 41 is memory devices 2 or 2a, burst-read instruction 61 is a DDR burst-read instruction that is received at read controller 12, and burst-read command 66 is a DDR burst-read command that is sent from read controller 12 to each of memory devices 2 or 2a.

Figure 12:
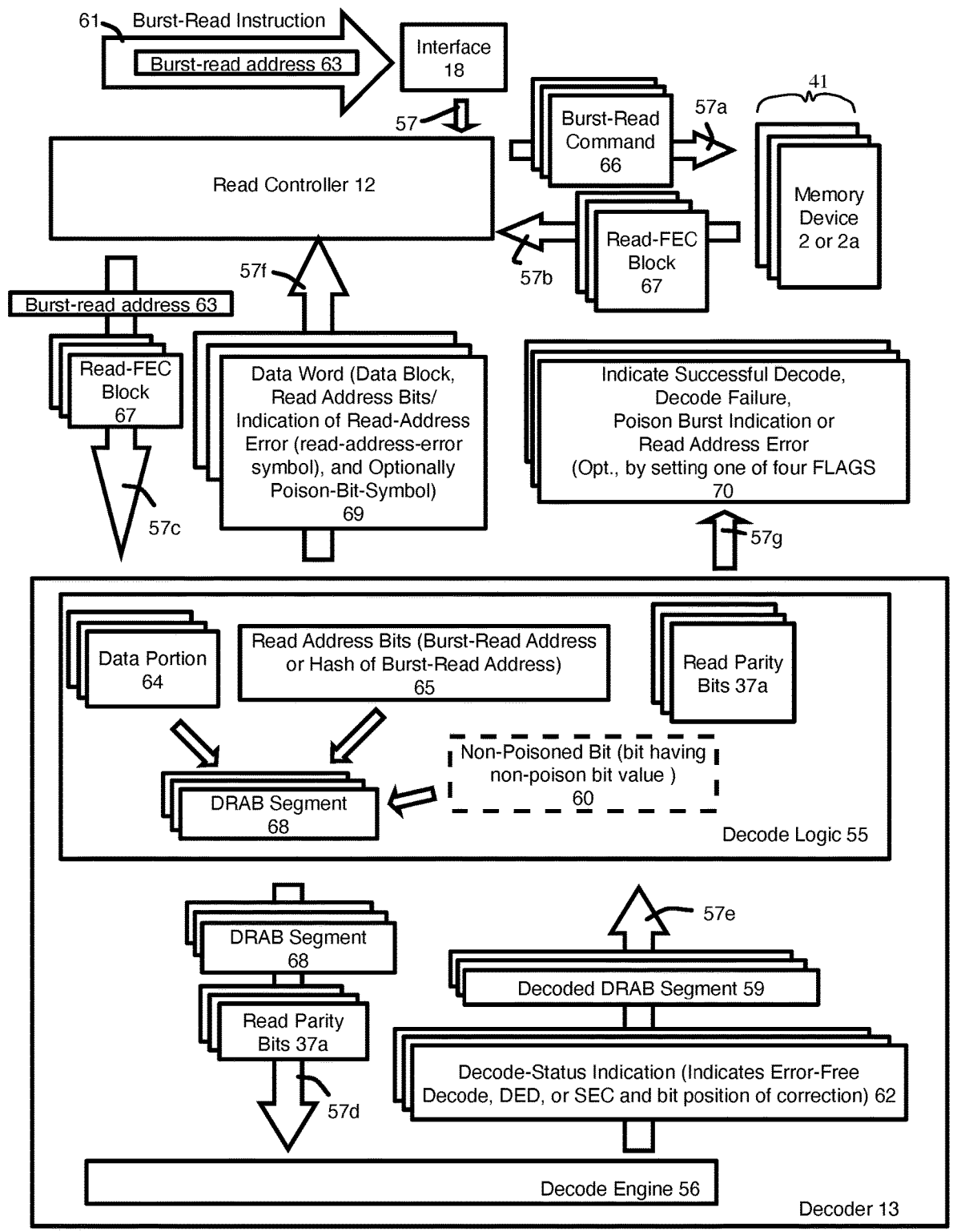
FIG. 12 illustrates functions of some of the structures of the memory system in relation to the method of FIG. 11.

Respective read-FEC blocks from the burst-read of step 201 include read parity bits that reflect data bits, one or more bits of a burst-write address or a hash of the burst-write address (the write address bits) and optionally a poison-indication bit. In one example the read-FEC blocks are the FEC blocks stored in method 100 such that address bits 35 and optionally poison-indication bit 30 are reflected in read parity bits 37a of each read-FEC block. The read-FEC blocks are segmented (202) to obtain a plurality of data portions and a plurality of corresponding sets of read parity bits for the respective data portions. In FIG. 12 read controller 12 sends the read-FEC blocks 67 and burst read address 63 (or a hash of burst-read address 63) to decoder 13 as is illustrated by arrow 57c. Decoder 13 segments the read-FEC blocks to obtain data portions 64 having the same size as those in the segmentation of step 102. Unless there is an uncorrected error in the decode process, the decode will produce data portions 64 that are the same as corresponding data blocks 34 stored in step 107 and corresponding read parity bits 37a that will be the same as the corresponding DWAB-PB 37 stored in step 107. In the present example the read parity bits are given the number 37a that is different from the number given to the parity bits 37 stored in method 100 to reflect the fact that an error could occur to cause the parity bits obtained from the read to be different from the originally stored parity bits 37. In an example implementation, the number of data portions 64, the number of read-FEC blocks 67, and the number of beats in the read of step 201 are each equal to 8. In another example implementation, the number of data portions 64, the number of read-FEC blocks 67, and the number of beats in the read of step 201 are each equal to 16.

One or more bits of the burst-read address, or a hash of the burst-read address, are concatenated (203) to respective data portions of the plurality of data portions to obtain a plurality of data-and-read-address-bit (DRAB) segments. In FIG. 12, decode logic 55 computes a hash of burst-read address 63 when a hash is required. Decode logic 55 concatenates one or more bits of the burst-read address 63, or a hash of the burst-read address, to a respective data portion 64 to form a corresponding DRAB segment 68. The one or more bits of the read address, or the hash of the read address, that are concatenated in step 203 can be referred to as "read address bits" and are illustrated as read address bits 65. In one example, each burst read generates 16 DRAB segments 68 that are coupled to decode engine 56 along with the corresponding read parity bits 37a as shown by arrow 57d. FIG. 13A shows an example in which the concatenation of step 203 produces a DRAB segment 68 that includes data portion 64 and read address bits 65.

When the DWAB-PB 37 of the FEC blocks reflect a poison-indication bit, optionally in step 203 the one or more bits of the burst-read address, or a hash of the burst-read address and a non-poisoned bit (a bit having the non-poison bit value) are concatenated to respective data portions of the plurality of data portions. In the example shown in FIG. 12 decode logic 55 generates non-poisoned-bit 60 (e.g., set to first value e.g., "0") and performs the concatenation. FIG. 13B shows an example in which the concatenation of step 204 produces a DRAB segment 68 that includes data portion 64, read address bits 65 and non-poisoned bit 60. The positioning of non-poisoned-bit 60 is, in one example, the same as the positioning selected in step 104 above.

The concatenation of steps 203 corresponds to the concatenation of steps 103 or 104 such that the size of the data portion 64 is the same as the corresponding data block 34 (also, they should include the same data, if there are no errors). Furthermore, DWAB segment 36 has the same number of bits as DRAB segment 68, and optionally a poison-bit indication 30, and should be concatenated in the same order as that of method 100. For example, if the write address bits 35 are concatenated to the end of each data block 34 in step 103, they are concatenated to the end of each data portion 64 in step 203; if write address bits 35 are concatenated to the beginning of each data block 34 in step 103, they are concatenated to the beginning of each data portion 64 in step 203, without limitation.

Respective ones of the plurality of DRAB segments are decoded (204) using the corresponding read parity bits 37a and using a SECDED decode operation to identify, for respective DRAB segments, the corresponding data block and when a single error correction (SEC) has occurred, the bit position of the corrected bit. In the example of FIG. 12 decode logic 55 sends DRAB segments 68 and read parity bits 37a to decode engine 56 as shown by arrow 57d and decode engine 56 performs the decode of step 204. Each decode of step 204 generates a decoded DRAB segment 59 that includes a corresponding data block and generates a decode-status indication 62 that indicates either an error-free decode, a double error detection (DED), or a SEC and an indication of the bit position of the corrected bit. The decode of step 204 is performed using DRAB segments 68 having the same number of data bits to generate decoded DRAB segments 59 that include data blocks 34 having the same number of bits as corresponding data blocks 34 stored in step 107, read address bits 65 having the same number of bits as corresponding write-address bits 35; and optionally non-poisoned bit 60 having the same number of bits as poison-indication bit 30. For example, if the encoding operation of step 105 is a SECDED encoding operation on 48 bits, the decode of step 205 is a SECDED decode operation on 48 bits.

In the example shown in FIG. 12 each decoded DRAB segment 59 (that will include data block 34) and the corresponding decode-status indication 62 are coupled to decode logic 55 as shown by arrow 57e. The decode-status indication can be sent in the form of a message or can be stored in a common memory area where they are accessible by both decode engine 56 and decode logic 55.

Decode logic 55 segments the decoded-DRAB segment 59 to obtain the data block 34a and read-address bits 65 and concatenates the data block 34a and read-address bits 65 to form a data word 69 that is coupled to read controller 12. In the present example the data block is given the number 34a that is different from the number 34 given to the data block 34 that was stored in method 100 to reflect the fact that an error could occur to cause the data block obtained from the segmentation to be different from the originally stored data block 34. When the FEC blocks reflect a poison-indication bit, decoded-DRAB segment 59 includes non-poisoned bit 60 that is removed by the segmentation and concatenation to generate a data word 69 that does not include non-poisoned bit 60.

Referring back to FIG. 11, when a decode of a DRAB segment is a SEC (205) and indicates a SEC in the bit position corresponding to the poison-indication bit (210) the decoded DRAB segment is determined to be poisoned (211) and a poison-bit symbol is generated at the decoder. In one example, decode logic 55 determines when a SEC has occurred in the bit position corresponding to the poison-indication bit such that the decoded DRAB segment is poisoned and generates the poison-bit symbol at the decoder. In one example the poison-bit symbol is included in the data word 69 output by decoder 13 in place of some or all of the read address bits to indicate that the particular decoded DRAB segment 68 is poisoned. In the example shown in FIG. 7 if poison-indication bit 30 is marked as a poison bit (set to a value of 1) before the encode operation of step 105 the decode operation of step 205 will have a single bit error in the bit position corresponding to poison bit 30 (because the bit was set to 1 in the encoding operation and 0 in the decode operation).

The number of poisoned DRAB segments in the burst-read (NPDS) is compared (212) to an error threshold (ET). In one example ET is set at four. In the example shown in FIG. 12, decode logic 55 counts the number of decodes in the burst-read that generate a SEC in the bit position corresponding to the poison-indication bit to determine NPDS. In one example decode logic 55 includes a counter that is zeroed prior to the decoding of step 204 and that is incremented each time a decode operation for a particular burst-read generates a SEC in the bit position corresponding to the poison indication bit. Decode logic 55 then performs the comparison of step 212-213.

When a NPDS does not exceed ET in block 213, the data block in the DRAB segment is sent (219) to read controller 12. In the example shown in FIG. 12, decode logic 55 segments the decoded-DRAB segment 59 to obtain the data block 34a and read-address bits 65. Decode logic 55 concatenates the data block 34a and read-address bits 65 to form a data word 69 that is sent to read controller 12. When NPDS exceeds ET (213-214) the burst-read is determined to have been marked as poisoned (214).

When the burst-read is determined to have been marked as poisoned in step 214 a poison-marker-indicated error is determined to have occurred and output is generated indicating that an error has occurred (e.g., an indication that an uncorrectable error has occurred) and the data blocks from the burst-read are not output (215). In one example the output generated at 215 is an error message that is sent from memory controller 5 to the entity that sent burst-read instruction 61 (e.g., an error message indicating an uncorrectable error in the burst-read) and the decoded blocks from the burst-read are not sent to the entity that sent burst-read instruction 61 (e.g., they are discarded by read controller 12).

When a decode of a DRAB segment is a SEC (205) and indicates a SEC in the bit position corresponding to the read-address bits (216) a read-address error is determined to have occurred (217). In one example, decode logic 55 determines when a SEC has occurred in the bit position corresponding to read-address bits 65 and generates a read-address-error symbol at the decoder. In one example the read-address-error symbol is included in the data word 69 output by decoder 13 in place of some or all of the read address bits to indicate to read controller 12 that a read-address error has occurred. When a read-address error is determined to have occurred decode logic 55 also sets one of a plurality of flags (e.g., a read-address error flag) to indicate that the read-address error has occurred. In FIG. 12 the one of the flags 70 that is the read-address error flag is set.

Referring now to step 218, when a read-address error is determined to have occurred, the method includes generating output indicating that an address error has occurred, requesting retransmission of the burst-read instruction, or generating output indicating that an address error has occurred and requesting retransmission of the burst-read instruction. In the example of FIG. 12, upon receiving data word 69 and/or in response to the setting of the read-address-error flag, read controller 12 either generates an error message that is coupled through interface 18, and is output to the external party that sent burst-read instruction 61; generates a message requesting retransmission of the burst-read instruction that is coupled through interface 18 to the external party that sent burst-read instruction 61; or both generates the error message that is output to the external party that sent burst-read instruction 61 and generates the message requesting retransmission of the burst-read instruction that is output to the external party that sent burst-read instruction 61. When a read-address error is determined to have occurred in step 217 the data blocks 34a in the burst-read are optionally not output. In one example, they are discarded and only the message(s) of step 218 are output.

When a decode of a DRAB segment is a SEC that does not indicate a SEC in the bit position corresponding to the poison-indication bit or in the bit position corresponding to the read-address bits, the data block in the DRAB segment is sent (219) to read controller 12. In the example shown in FIG. 12, decode logic 55 segments the decoded-DRAB segment 59 to obtain the data block 34a and read-address bits 65. Decode logic 55 concatenates the data block 34a and read-address bits 65 to form a data word 69 that is sent to read controller 12.

When a decode of a DRAB segment is a DED (206), an uncorrectable error has occurred and output is generated (209) indicating that an error has occurred and the data blocks of the burst-read are not output. In the example shown in FIG. 12, decode logic 55, in response to receiving decode-status indication 62 determines when the decode-status indication indicates a DED and in response sets one of four flags as shown by block 70 of FIG. 12 (e.g., sets the decode failure flag). In response to the setting of the decode failure flag read controller 12 generates output indicating that an error has occurred and does not output the data blocks 34a of the burst-read. In one example the output generated at 209 is an error message that is sent from memory controller 5 to the entity that sent burst-read instruction 61 (e.g., an error message indicating an uncorrectable error in the burst-read).

The processing of respective DRAB segments 68 continues (at 220, 204 and 219, 204) until a DED occurs (206) or until all DRAB segments in the burst-read have been decoded (207-208). When there is no DED 206, no SEC 205, and all DRAB segments in the burst-read have not yet been decoded 207, the data block is sent (220) to the read controller 12 (e.g., in a data word 69 that includes the read address bits and the data block).

When there is no SEC 205, and no DED in the decode of the burst read (206), and the burst-read has not been marked as poisoned (214), data blocks 64 of the burst-read are output (208) from memory controller 5 to the entity that sent burst-read instruction 61 as the result of the read operation.

The methods and apparatus of the present invention allow for protection of reads of memory devices from address errors by effectively identifying address errors when they occur, and allowing for poison-bit marking of address errors in such a way so as not to reduce the number of bits available to store ECC parity bits. More particularly, faulty address writes or reads that are detected (e.g., by the decoder) are identified and corrective action is taken so as to prevent the faulty data associated therewith from potentially corrupting the operation of the system.

Though the above examples use 8 parity bits, it is appreciated that, alternatively, more or fewer parity bits could be used.

For clarity and brevity, as well as to avoid unnecessary or unhelpful obfuscating, obscuring, obstructing, or occluding features or elements of an example of the disclosure, certain intricacies and details, which are known generally to artisans of ordinary skill in related technologies, have been omitted or discussed in less than exhaustive detail. Any such omissions or discussions are unnecessary for describing examples of the disclosure, and/or not particularly relevant to an understanding of significant features, functions and aspects of the examples of the disclosure described herein.

The term "or" is used herein in an inclusive, and not exclusory sense (unless stated expressly to the contrary in a particular instance), and use of the term "and/or" herein includes any and all combinations of one or more of the associated listed items, which are conjoined/disjoined therewith. Within the present description, the term "include," and its plural form "includes" (and/or, in some contexts the term "have," and its conjugate "has") are respectively used in same sense as the terms "comprise" and "comprises" are used in the claims set forth below, any amendments thereto that are potentially presentable, and their equivalents and alternatives, and/or are thus intended to be understood as essentially synonymous therewith.

The figures are schematic, diagrammatic, symbolic and/or flow-related representations and so, are not necessarily drawn to scale unless expressly noted to the contrary herein. Unless otherwise noted explicitly to the contrary in relation to any particular usage, specific terms used herein are intended to be understood as in a generic and/or descriptive sense, and not for any purpose of limitation.

In the specification and figures herein, examples implementations are thus described in relation to the claims set forth below. The present disclosure is not limited to such examples however, and the specification and figures herein are thus intended to enlighten artisans of ordinary skill in technologies related to integrated circuits in relation to appreciation, apprehension and suggestion of alternatives and equivalents thereto.

What is claimed is:

1. A method for memory protection, the method comprising:
   receiving a burst-write instruction, the burst-write instruction including data and a burst-write address;
   segmenting the data into a plurality of data blocks;
   concatenating one or more bits of the burst-write address, or a hash of the burst-write address, to respective data blocks of the plurality of data blocks to obtain a plurality of data-and-write-address-bit (DWAB) segments;
   executing a Single Error Correction Double Error Detection (SECDED) error correction code on respective DWAB segments of the plurality of DWAB segments to generate a corresponding plurality of sets of parity bits (DWAB-PB);
   concatenating a respective DWAB-PB of the plurality of DWAB-PD to the corresponding data block to generate corresponding forward-error-correction (FEC) blocks, the FEC blocks not including the burst-write address or the hash of the burst-write address; and
   sending a burst-write command and a respective portion of a respective one of the FEC block of the plurality of FEC blocks to respective memory devices of a plurality of memory devices during a plurality of beats until all beats of the burst-write have been sent.

2. The method of claim 1 wherein the segmenting the data comprises segmenting the data into a number of data blocks equal to a number of beats of the burst-write.

3. The method of claim 1,
   wherein the concatenating one or more bits of the burst-write address, or a hash of the burst-write address, further comprises concatenating respective poison-indication bits to obtain the DWAB segments.

4. The method of claim 1 comprising:
   performing a burst-read responsive to receiving a burst-read instruction that includes a burst-read address; and
   determining when read-address errors have occurred using the burst-read address and the DWAB-PB in the respective FEC blocks.

5. The method of claim 4 comprising:
   when a read-address error is determined to have occurred, indicating that an address error has occurred, requesting retransmission of the burst-read instruction, or
   indicating that an address error has occurred and requesting retransmission of the burst-read instruction.

6. The method of claim 4 when the performing the burst-read and determining when read-address errors have occurred comprises:
   performing the burst-read responsive to receiving the burst-read instruction, and receiving in response a plurality of read-FEC blocks;
   segmenting the read-FEC blocks to obtain a plurality of read data portions and a plurality of corresponding read parity bits;
   concatenating one or more bits of the burst-read address, or a hash of the burst-read address, with respective read data portions of the plurality of read data portions to obtain a plurality of data-and-read-address-bit (DRAB) segments;
   decoding, using a SECDED decode operation, respective ones of the plurality of DRAB segments using the corresponding read parity bits to identify, for respective DRAB segments, a data block and when a Single Event Correction (SEC) has occurred, a bit position of a corrected bit,
   wherein a read-address error is determined to have occurred when the SEC has occurred and the bit position of the corrected bit corresponds to the one or more bits of the burst-read address, or a hash of the burst-read address.

7. A method for memory protection comprising:
   performing a burst-read in response to receiving a burst-read instruction that includes a burst-read address by sending a burst-read command to a plurality of memory devices and receiving in response a plurality of read-forward-error-correction (FEC) blocks;
   segmenting the read-FEC blocks to obtain a plurality of read data portions and a plurality of corresponding sets of read parity bits;
   concatenating one or more bits of the burst-read address, or a hash of the burst-read address, to respective read data portions of the plurality of read data portions to obtain a plurality of data-and-read-address-bit (DRAB) segments;
   decoding respective ones of the plurality of DRAB segments using the corresponding read parity bits and using a SECDED decode operation to identify, for respective DRAB segments, a read data block and when a Single Event Correction (SEC) has occurred, a bit position of a corrected bit;
   determining that a read-address error has occurred when the SEC has occurred and the bit position of the corrected bit corresponds to the one or more bits of the burst-read address, or the hash of the burst-read address,
   when the read-address error has occurred:
     indicating that an address error has occurred,
     requesting retransmission of the burst-read instruction, or
     indicating that an address error has occurred and requesting retransmission of the burst-read instruction.

8. The method of claim 7 wherein the read parity bits reflect a data block and one or more bits of a burst-write address, or a hash of the burst-write address.

9. The method of claim 7 wherein the concatenating one or more bits of the burst-read address, or the hash of the burst-read address, further comprises concatenating a non-poison bit to the respective data blocks of the plurality of data blocks to obtain the plurality of DRAB segments.

10. An integrated circuit (IC) device comprising:
    a memory controller to:
      receive a burst-write instruction that includes data and a burst-write address,
      segment the data into a plurality of data blocks,
      concatenate one or more bits of the burst-write address, or a hash of the burst-write address, to respective data blocks of the plurality of data blocks to obtain a plurality of data-and-write-address-bit (DWAB) segments, execute a Single Error Correction Double Error Detection (SECDED) error correction code on respective DWAB segments of the plurality of DWAB segments to generate a corresponding plurality of sets of parity bits (DWAB-PB), concatenate a respective set of parity bits of the plurality of sets of parity bits to the corresponding data block to generate corresponding forward-error-correction (FEC) blocks, the FEC blocks not including the one or more bits of the burst-write address, or the hash of the burst-write address, send a burst-write command and a respective portion of a respective one of the FEC blocks to individual ones of a plurality of memory devices during each of a plurality of beats until all beats of the burst-write have been sent.

11. The IC device of claim 10 wherein the memory controller includes a write controller and an encoder coupled to the write controller, the write controller to:
receive the burst-write instruction,
concatenate the one or more bits of the burst-write address, or the hash of the burst-write address, to respective data blocks of the plurality of data blocks to obtain the plurality of DWAB segments, and the encoder to:
execute the SECDED error correction code, and
concatenate the respective set of parity bits to the corresponding data block to generate the corresponding FEC blocks.

12. The IC device of claim 10 wherein the plurality of memory device are internal to the IC device and coupled to the memory controller.

13. The IC device of claim 10,
wherein the concatenating one or more bits of the burst-write address, or the hash of the burst-write address, further comprises concatenating a poison-indication bit to respective data blocks of the plurality of data blocks to obtain the plurality of DWAB segments,
wherein none of the FEC blocks include the poison-indication bit, the one or more bits of the burst-write address, or the hash of the burst-write address.

14. The IC device of claim 10 wherein the segmenting the data comprises segmenting the data into a number of data blocks equal to a number of the plurality of beats.

15. The IC device of claim 10 wherein the one or more bits of the burst-write address, or the hash of the burst-write address, are concatenated to the end of a respective one of the plurality of data blocks.

16. The IC device of claim 10 wherein the one or more bits of the burst-write address, or the hash of the burst-write address, are concatenated to the beginning of a respective one of the plurality of data blocks.

17. The IC device of claim 10 wherein the plurality of memory devices are discrete, double-data-rate (DDR) memory devices, and the IC device is a discrete IC device coupled to the DDR memory devices.

18. The IC device of claim 10 wherein the memory controller is to:
perform a burst-read operation in response to receiving a burst-read instruction that includes a burst-read address by sending a burst-read command to the respective memory devices of the plurality of memory devices and receive in response a plurality of read-FEC blocks,
segment the plurality of read-FEC blocks to obtain a plurality of read data portions and a plurality of corresponding read parity bits,
concatenate one or more bits of the burst-read address, or a hash of the burst-read address, to a corresponding data portion of the plurality of read data portions to obtain a plurality of data-and-read-address-bit (DRAB) segments,
decode respective ones of the plurality of DRAB segments using the corresponding read parity bits and using a Single Error Correction Double Error Detection (SECDED) decode operation to identify, for respective DRAB segments of the plurality of DRAB segments, a data block and when a Single Event Correction (SEC) has occurred, a bit position of a corrected bit,
determine that a read-address error has occurred when the SEC has occurred and the bit position of the corrected bit corresponds to the one or more bits of the burst-read address, or the hash of the burst-read address,
when the read-address error has occurred:
indicating that an address error has occurred,
requesting retransmission of the burst-read instruction, or
indicating that an address error has occurred and requesting retransmission of the burst-read instruction.

19. The IC device of claim 18 wherein the memory controller includes a read controller and a decoder coupled to the read controller,
the read controller to perform the burst-read operation to obtain the plurality of read-FEC blocks and to couple the plurality of FEC blocks to the decoder, and
the decoder to segment the read-FEC blocks, to perform the concatenation, to perform the decode and to determine that the read-address error has occurred.

20. The IC device of claim 10 wherein the memory controller is to:
perform a burst-read operation in response to receiving a burst-read instruction that includes a burst-read address by sending a burst-read command to the respective memory devices of the plurality of memory devices and receive in response a plurality of read-FEC blocks,
segment the plurality of read-FEC blocks to obtain a plurality of read data portions and a plurality of corresponding read parity bits,
concatenate one or more bits of the burst-read address, or the hash of the burst-read address to a corresponding data portion of the plurality of read data portions and to a non-poisoned bit to obtain a plurality of data-and-read-address-bit (DRAB) segments,
decode respective ones of the plurality of DRAB segments using the corresponding read parity bits and using a Single Error Correction Double Error Detection (SECDED) decode operation to identify, for respective DRAB segments of the plurality of DRAB segments, a data block and when a Single Event Correction (SEC) has occurred, a bit position of a corrected bit,
determine that a read-address error has occurred when a SEC has occurred and the bit position of the corrected bit corresponds to the one or more bits of the burst-read address, or the hash of the burst-read address,
when the read-address error has occurred:
indicate that an address error has occurred,
request retransmission of the burst-read instruction, or indicate that an address error has occurred and requesting retransmission of the burst-read instruction,
determine that a decoded DRAB segment is poisoned when a SEC has occurred and the bit position of the corrected bit corresponds to the poison-indication bit, compare a determined number of poisoned DRAB segments in the burst-read (NPDS) to an error threshold,
when the determined NPDS exceeds the error threshold, determine that the burst-read has been marked as poisoned,
when the burst-read has been marked as poisoned generating output that an error has occurred.

* * * * *